(No Model.)

T. H. BOTTOMLEY.
SAW MILL DOG.

No. 277,981. Patented May 22, 1883.

Attest:
A. Barthel

Inventor:
Thos. H. Bottomley
by his Atty Thos. S. Sprague

UNITED STATES PATENT OFFICE.

THOMAS H. BOTTOMLEY, OF CAPAC, MICHIGAN.

SAW-MILL DOG.

SPECIFICATION forming part of Letters Patent No. 277,981, dated May 22, 1883.

Application filed January 31, 1883. (No model.)

*To all whom it may concern:*

Be it known that I, THOMAS H. BOTTOMLEY, of Capac, in the county of St. Clair and State of Michigan, have invented new and useful Improvements in Saw-Mill Dogs; and I hereby declare that the following is a full, clear, and exact description thereof, reference being had to the accompanying drawings, which form a part of this specification.

This invention relates to certain new and useful improvements in the construction of saw-mill dogs; and the invention consists in the peculiar construction and arrangement of the various parts, all as more fully hereinafter set forth.

Figure 1:
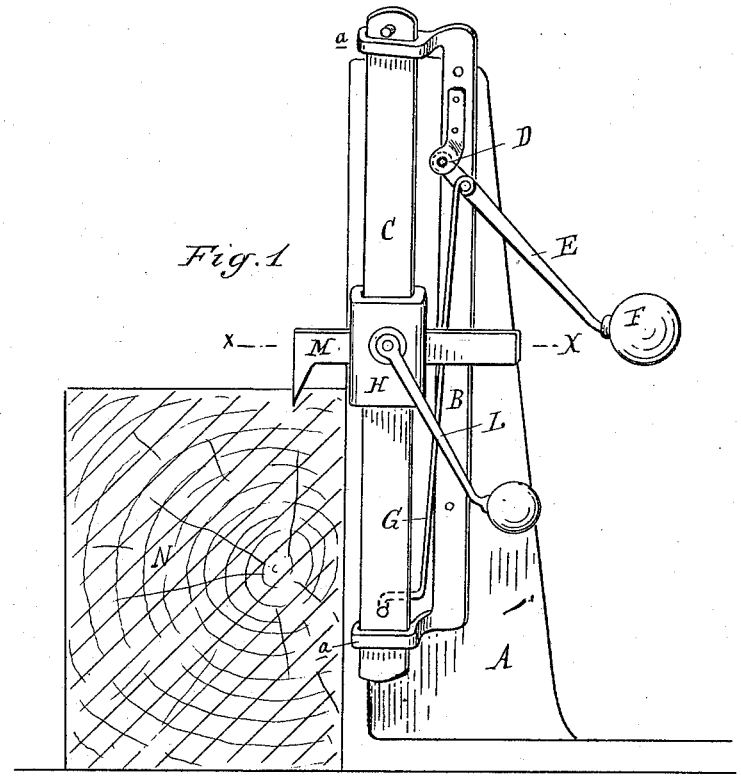
Figure 2:
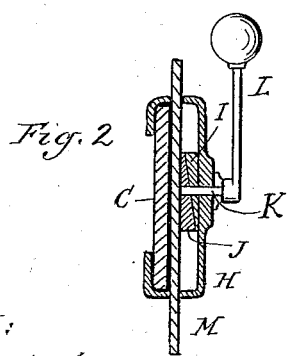

Figure 1 is a perspective view, showing my improved mill-dog as attached to the knee of a saw-mill; and Fig. 2 is a horizontal section on the line X X in Fig. 1.

In the accompanying drawings, which form a part of this specification, A represents the knee, to which is rigidly secured the vertical bar B, which is provided with the lateral projecting ends a, in which are formed suitable eyes, through which the vertical bar C has a vertical movement.

Near the upper end of the bar B is rigidly secured an arm, D, to which is fulcrumed the inner end of the lever E, the outer end of which carries a suitable weight, F. One end of a rod, G, is pivotally secured to the lever E, while the opposite end is rigidly secured to and near the lower end of the vertical bar C.

H is a slide, which embraces the vertical bar C, and to the inner face of this slide H is rigidly secured the cam-disk I; or the same may be cast with or form an integral part of such slide. J is a similar cam-disk, which impinges against the face of the disk I, and is secured rigidly to the inner end of a short rock-shaft, K, which is properly journaled through the center of the cam I and the slide H, said shaft K carrying upon its outer end a weighted lever, L.

M represents the dog, which passes through a horizontal slot in the slide H, and passes between the outer face of the cam J and the inner face of the vertical bar C.

In practice the slide H is vertically adjusted upon the bar C, and the dog M projected from the slide as far as may be desired, so that it will rest upon the top of the log N upon the saw-carriage, the weighted lever L being in position shown in Fig. 1, which brings the two thick portions of the two cams together, firmly binding the dog and slide to their adjusted position upon the bar C. By then depressing the lever E the bar C with the slide and dog are compelled to move downward, which drives the dog into the log, thereby securely "dogging" the log to place. To relieve the log or cant, the lever E is raised, which compels a corresponding movement of the bar C, slide H, and dog M, relieving the dog from its engagement with the log. It will be seen that the dog may be advanced or retracted, so as to engage with round or square timber, and that it may be raised or lowered as the size of the timber to be operated upon may demand. It is important that the dog M, in its contact with the log, should have a direct vertical movement, and this is afforded by the bar C acting in the vertical guides, as shown. The weights upon the levers E and L serve efficiently to hold the parts in a locked condition after the proper adjustment has been obtained.

I am aware of the Patent No. 233,627, issued to Geo. F. Knight, October 26, 1880, and make no claim to the construction shown therein.

What I claim as my invention is—

In a saw-mill dog constructed substantially as described, and in combination with the vertical sliding bar C thereof, the slide H, carrying cam-disks I and J, shaft K, rigid with the cam J, and the cam I, rigid with the slide H, the lever L for actuating the cam J and the dog M, substantially as and for the purposes specified.

THOS. H. BOTTOMLEY.

Witnesses:
H. S. SPRAGUE,
E. SCULLY.